United States Patent
Zhang et al.

(10) Patent No.: US 11,518,619 B1
(45) Date of Patent: Dec. 6, 2022

(54) MATERIAL CONVEYING DEVICE AND SCRAPER

(71) Applicant: Shandong Lingxiyuan Sci-tech Development Corporation, Jinan (CN)

(72) Inventors: Xiaofeng Zhang, Jinan (CN); Lanying Ma, Jinan (CN); Peng Qi, Jinan (CN); Xiaoqi Zhang, Jinan (CN)

(73) Assignee: SHANDONG LINGXIYUAN SCI-TECH DEVELOPMENT CORPORATION, Jinan (CN)

( * ) Notice: Subject to any disclaimer, the term of this patent is extended or adjusted under 35 U.S.C. 154(b) by 0 days.

(21) Appl. No.: 17/269,857

(22) PCT Filed: Sep. 30, 2020

(86) PCT No.: PCT/CN2020/119210
§ 371 (c)(1),
(2) Date: Feb. 19, 2021

(87) PCT Pub. No.: WO2021/139277
PCT Pub. Date: Jul. 15, 2021

(30) Foreign Application Priority Data

Jan. 9, 2020 (CN) .......................... 202010022714.8

(51) Int. Cl.
*B65G 19/06* (2006.01)
*B65G 21/22* (2006.01)
*B65G 19/22* (2006.01)

(52) U.S. Cl.
CPC ............. *B65G 19/06* (2013.01); *B65G 19/22* (2013.01); *B65G 21/22* (2013.01); *B65G 2207/48* (2013.01)

(58) Field of Classification Search
CPC ........ B65G 19/06; B65G 19/22; B65G 21/22; B65G 2207/48
See application file for complete search history.

(56) References Cited

U.S. PATENT DOCUMENTS

| 4,079,833 A * | 3/1978 | Rollins | ............... B65G 19/24 198/733 |
| 4,573,565 A * | 3/1986 | Braun | ................ B65G 19/22 198/734 |

(Continued)

FOREIGN PATENT DOCUMENTS

| CN | 1277277 | 12/1990 |
| CN | 201703819 U | 1/2011 |

(Continued)

OTHER PUBLICATIONS

English Translation of Chinese Office Action Application No. 202010022714.8; dated Oct. 19, 2020; pp. 7.

(Continued)

*Primary Examiner* — Mark A Deuble
(74) *Attorney, Agent, or Firm* — Cantor Colburn LLP (57) ABSTRACT

The present invention provides a scraper including a scraper body, having opposed bottom and top surfaces and a supporting body, formed on the bottom surface. The supporting body is provided with a mounting surface forming a part of the bottom surface. The mounting surface is provided with a rolling body able to support the scraping body when the scraper is located at a mounting position. The supporting body is a nonmetallic elastomer. The present invention also provides material conveying equipment using the scraper. By changing a contact and friction mode of the scraper and a conveying groove, a working state of the scraper and the a whole load of the conveyor are improved, idle load is reduced, and the whole service life of the scraper and even the scraper conveyor is prolonged.

6 Claims, 7 Drawing Sheets

(56) References Cited

U.S. PATENT DOCUMENTS

| | | | | |
|---|---|---|---|---|
| 4,815,586 | A | 3/1989 | Heising | |
| 5,533,604 | A | 7/1996 | Brierton | |
| 6,662,932 | B1 * | 12/2003 | O'Neill | B65G 19/08 198/728 |
| 8,662,287 | B2 * | 3/2014 | Fischer | B65G 19/22 198/733 |
| 8,919,538 | B2 * | 12/2014 | Tout | B65G 19/22 198/729 |
| 10,882,700 | B1 * | 1/2021 | Tang | B65G 43/00 |

FOREIGN PATENT DOCUMENTS

| | | |
|---|---|---|
| CN | 02963679 A | 3/2013 |
| CN | 04341852 U | 5/2015 |
| CN | 204751281 U | 11/2015 |
| CN | 105947545 A | 9/2016 |
| CN | 106144417 A | 11/2016 |
| CN | 111056228 A | 4/2020 |

OTHER PUBLICATIONS

English Translation of Chinese Office Action Application No. 202010022714.8; dated Sep. 15, 2020; pp. 8.
English Translation of Notice of Allowance Application No. 202010022714.8; dated Dec. 4, 2020; pp. 3.
Wu Zongze, et al.: "Mechanical Design"; China Railway Publishing House; ISBN 978-7-113-20684-0; Xicheng District, Beifu City, CN; (2015) No. 153379; pp. 6.
Zha Wusheng, et al.: "Uidance Of Design For Stamping And Plastics Mould"; ISBN: ISBN 978-7-113-20684-0; Shapingba District, Chongqing, CN; Aug. 2016; pp. 6.

* cited by examiner

MATERIAL CONVEYING DEVICE AND SCRAPER

This application is a National Phase of PCT Application No. PCT/CN2020/119210 filed Sep. 30, 2020 which claims priority to Chinese Application No. 202010022714.8 filed on Jan. 9, 2020, entitled "MATERIAL CONVEYING DEVICE AND SCRAPER", which is incorporated herein by reference in its entirety.

TECHNICAL FIELD

The present invention belongs to the field of manufacturing of mechanical equipment, particularly relates to conveying equipment, and in particular, to a material conveying device and a scraper.

BACKGROUND

At present, the scraper conveyor applied to various industrial production is main transportation equipment for continuously transporting particle materials. Especially in the mining field, for example, in coal mining, the scraper conveyor can cooperate with mining equipment well to serve as a movable supporting rail of the mining equipment, and can be driven by a hydraulic bracket for position adjustment and propulsion. In particular, when the scraper conveyor is applied to the current coal mining operation, the scraper conveyor not only serves as a coal and material conveying carrier, but also is a running track of a coal mining machine, so the scraper conveyor has become the indispensable main equipment in the modern coal mining technology. The scraper conveyor can maintain continuous operation, and production can be conducted normally. Otherwise, the whole coal mining face will be in a shutdown state, so that the whole production is interrupted.

The size, transportation volume and reliability of the conveyed materials are the basic characteristics of the scraper conveyor within the life period. In the complete set of scraper conveyor, the scraper is one of the key components that affect the efficiency and reliability of the scraper conveyor. The innovative and improved design of the scraper is an important part of the design of the scraper conveyor.

The main structure and components of the scraper conveyor are basically the same. The scraper conveyor mainly consists of four parts: a head part, a middle groove, a tail part and a scraper chain component. The working principle is as follows: an open groove ledge arranged on the middle groove is used as a receiving mechanism of materials such as coal and the like, and the scraper is fixed on the chain (forming a scraper chain assembly) to serve as a conveying component. When a driving device of the head part starts, a chain wheel arranged on a driving shaft and a driven shaft rotates along with the driving device, so that the scraper chain is driven to circulate and move along the groove ledge, thus achieving the aim of conveying the materials from the middle groove to the head part for unloading. The scraper chain bypasses the chain wheel for infinite closed cyclic operation.

In the process of making the invention, the inventor found that the failure of the scraper conveyor at present is mainly because:

the poor working condition: the scraper conveyor mainly works under the mine. Firstly, the coal gangue often slides between the groove ledge and the scraper, and the scraper and the chain are serious rubbed, resulting in the increased wear of the scraper conveyor; secondly, coal and air in the coal mining face contain corrosive substances such as sulfur, phosphorus and the like, which will also lead to the increased corrosion of the scraper conveyor.

Based on this, the failure forms of the scraper conveyor are mainly due to wear and fatigue failure. Under the certain working conditions, the maximum stress in some areas of the scraper exceeds the allowable stress of the scraper material, leading to strength failure.

At present, most of the scraper conveyors for coal mine are forged and pressed products of alloy steel materials and have a large weight and high friction resistance; and the scraper and the groove ledge bottom plate are under dynamic load static pressure friction wear, especially the extrusion wear of the scraper and the groove ledge seriously affects the service life of the scraper conveyor. Furthermore, the no-load of the scraper conveyor is too large due to the weight of the scraper made of alloy materials, and about 35% or above of driving output power is used to do work to drive the scraper to move. In order to meet the demand for transportation capacity, only the output power of the driving device can be increased. In this way, on one hand, energy consumption and the transportation cost of the equipment will be increased; on the other hand, to improve the output power, it is necessary to increase the volume and weight of the driving device and increase the manufacturing cost of the equipment; meanwhile, the overweight driving device will increase the whole weight of the scraper conveyor and the working pressure of the hydraulic bracket; furthermore, due to too large volume of the driving device, higher requirement on the operating space of the work place is put forwards, so that the flexibility of the scraper conveyor is reduced and the work limitation is increased.

In addition, the scraper is made of hard alloy steel, and after the materials such as coal mined by the coal mining equipment collide with the scraper in the discharging process, it is possible that larger blocky coal will be crushed, which will affect the quality of the coal products, thus reducing the economic index of mining from another aspect.

The above technical problems are discovered by the inventor in the process of realizing the invention, which are the inventor's technical knowledge, but do not necessarily constitute the prior art.

SUMMARY

The present invention aims to provide a material conveying device and a scraper, so as to solve at least one technical problem or defect mentioned in the background art.

The technical intention of the present invention is realized by the following technical solution:

a material conveying device includes:
a material conveying groove;
a scraper chain assembly, including:
an annular chain, the chain being able to circularly move relative to the material conveying groove along a material conveying direction;
scrapers, arranged on the chain at intervals, each of the scrapers including:
a scraper body, having a bottom surface close to the material conveying groove and a top surface opposite to the bottom surface;
a supporting body, arranged on the bottom surface of the scraper body, wherein the supporting body is provided with a mounting surface and the mounting surface forms a part of the bottom surface; the mounting surface is provided with a rolling body, and the rolling body is able to support the scraping body when the scraper is located above the material conveying groove; moreover, the supporting body is a nonmetallic elastomer; and a driving device, being able to drive the chain to rotate circularly relative to the material conveying groove along a material conveying direction.

The material conveying device, for example the scraper conveyor using the scrapers, is provided with the rolling bodies, the friction mode between the scraper and the material conveying groove is changed from the original sliding friction contact into the rolling friction contact, and the reduction of the friction coefficient may greatly reduce the friction resistance of the scraper and the groove body, thus reducing the power loss of the driving device driving the scraper, finally reducing the load energy consumption of the scraper conveyor, or improving the effective work applying rate of the output power. Therefore, reduction of the rated output power of the driving device is supported to achieve the aim of reducing the specifications of the driving device and realize optimal design.

In addition, the rolling friction contact mode is bound to reduce the wear condition of the scraper and the groove ledge of the conveying groove, especially in cooperation with the supporting body constructed by the non-metallic elastomer, the contact of the rolling body and the conveying groove can be buffered by the elastic supporting body, thus further improving the operation stability of the scraper chain assembly in the rolling friction contact process. The most direct effect is that the wear loss of the scraper and the conveying groove is greatly reduced by the changed friction mode, and the replacement and maintenance cycles of the scraper are greatly prolonged and can be basically prolonged by at least three times or above compared with the traditional alloy steel scraper. Moreover, due to the change of the friction contact mode, the failure part of the scraper mainly occurs in the supporting body, and the scraper main body is hardly worn. When the scraper is replaced or maintained, it is only necessary to replace or maintain the supporting body, thus reducing the maintenance cost and improving the maintenance efficiency.

From another point of view, the supporting body serves as one part of the scraper, and the scraper body adopts the non-metallic elastomer instead of the common alloy steel, so that the weight of the scraper can be reduced to a certain degree, and the no-load load of the scraper conveyor can be further reduced.

The rolling body is arranged on the supporting body, the elastic function of the supporting body is to make the supporting body show a certain "expansion" trend, and the trend is released on the bottom surface of the supporting body to push the rolling body close to the conveying groove, so that the rolling body and the conveying groove can still be in effective contact. When a plurality of rolling bodies are provided, it may be ensured that all the rolling bodies can reliably keep contact with the conveying groove. On one hand, the load of the whole scraper is balanced, and on the other hand, the service life and the replacement cycle of the rolling bodies are uniform, so that the actual requirements of the industrial design are met.

Furthermore, in the whole scraper, the supporting body supports the scraper body by the rolling body, so that the scraper as a whole has a certain degree of buffering. When the scraper receives impact applied by the top, the elasticity of the supporting body can buffer and absorb part of impact, so that the reverse impact received by the coal falling on the scraper can be reduced to a certain degree, thus enabling the coal to fall into the conveying groove after receiving the buffer, reducing the crushing events of the coal, increasing the proportion of the blocky coal in the coal and improving the quality of the coal.

The supporting body formed by the non-metallic elastomer serves as a supporting structure for mounting the rolling body, so that the elastic rolling meeting the overall stability of the structure is improved. The elastic buffering force is provided by the characteristic of the material, which does not depend on the specific elastic structure, so that the load balance and long-time stable operation of the rolling body may be maintained and the elastomer may maintain a stable state for a long time, thereby avoiding the failure caused by damage or deformation of the structure and the failure to maintain an ideal elastic property. This will be very suitable for the working environment of the coal mining operation of the scraper conveyor. One idea is to adopt a metal elastomer, for example a spring, etc., to provide a buffering mode by an elastic structure, which is proved to be infeasible by the inventor. Especially in the coal mining, the coal particles and coal gangue particles in the conveying groove cause unevenness between the scraper and the conveying groove, and the spring only can provide an elastic supporting force in a roughly fixed direction and obviously cannot stably support the rolling body. In addition, if the spring is used as an elastic support, the spring is liable to be damaged due to contact between the spring and the material particles. The blocky non-metallic elastomer can perfectly avoid the defect of the metal elastomer and can serve as a whole body to support the rolling body from multiple angles and directions, and there is no need to worry about the structure damage as long as the supporting body is replaced or reconstructed after a certain degree of wear. By selecting appropriate materials, the supporting body may have higher wear resistance and corrosion resistance while having elasticity.

As a preferred implementation manner, a mounting groove is formed in the bottom surface of the scraper body, and the supporting body is able to be embedded into the mounting groove.

One of the mounting methods of the supporting body is to form the mounting groove on the scraper body and mount the processed supporting body into the mounting groove. The elastic material of the supporting body determines that assembly may be conducted in an interference fit mode, or the supporting body with a larger size directly cooperates with the mounting groove with a smaller size, and the supporting body is embedded into the mounting groove through extrusion. By the mounting method, the supporting bodies may be manufactured in batches; moreover, the rolling body may be mounted on the supporting body firstly, and then the rolling body and the supporting body are arranged on the scraper body, so that the assembling of the rolling body becomes simple and convenient. Furthermore, it is very simple and convenient to disassemble, assemble and replace the supporting body. Preferably, a texture or a step surface mutually matched with a combined surface is formed on the combined surface of the mounting groove and/or the supporting body, thereby improving the embedding tightness.

As a preferred implementation manner, the supporting body is integrally formed on the bottom surface of the scraper body.

Another forming method of the supporting body is to from the supporting body on the bottom surface of the scraper body through direct vulcanization, pouring or injection molding, which is suitable for manufacturing appropriate scraper bodies in batches. A forming surface or a forming groove is reserved, the scraper body serves as an external mold, and the non-metallic elastic material and the rolling body are directly formed on the scraper body through vulcanization, pouring, injection molding and the like. By the forming method, the assembling process is simplified, and the combination tightness of the supporting body and the scraper body is improved. Of course, it also depends on the proper selection of the elastic material. An ideal combination effect may be achieved by selecting the non-metallic elastic material which is combined with the metal surface well and meets strength, corrosion resistance, weather resistance and other properties.

As a preferred implementation manner, a material of the supporting body is a macromolecular polyurethane material.

As mentioned above, as the ideal effect of realizing the technical intention of each technical solution of the present invention, it is preferable to construct the supporting body by the macromolecular polyurethane material or other elastic materials with the same property.

As a preferred implementation manner, the material conveying device further includes:

a rolling support, arranged on the mounting surface of the supporting body, wherein a rolling groove is formed in the rolling support; and the rolling body is a roll ball mounted in the rolling groove.

The rolling body may be a composite rolling body or may be a structure which independently can roll freely or has a free rolling trend. The ideal rolling body has a spherical roll ball structure, a rolling groove is provided in cooperation with the roll ball. The rolling groove is configured as a matched state where the roll ball is fixed in the rolling groove to form a spherical pair, and the rolling groove is of a semi-closed structure. The exposed part of the roll ball is in rolling contact, and the rest is in the rolling groove. The rapid implementation manner may be that an appropriate universal ball is directly used as a composite rolling body and a whole set of structure of the rolling support and the roll ball is provided. Of course, the support and the roll ball may be self-processed according to the actual requirement.

The lubrication requirement of the roll ball may be met by filling a lubricating medium, or by setting a rolling groove opening to be matched with the size of the roll ball, so that materials with a very small particle size, such as carbon powder particles in the coal, are allowed to enter between the roll ball and the rolling groove to serve as a lubricating medium for lubrication.

In particular, the roll ball and the rolling groove supporting the roll ball are in rigid contact. The direct supporting structure of the roll ball is preferably a rigid structure rather than an elastic structure, which will ensure the reliable combination of the roll ball and the rolling support.

As a preferred implementation manner, the rolling support is detachably arranged on the mounting surface of the supporting body.

The self-processed rolling support or the rolling support provided by the manure existing finished product universal ball may be arranged in different ways, for example the rolling support may be jointly formed with the supporting body by mold pressing and pouring. One of the above preferred manners is to mount the rolling support and the supporting body together in a detachable and replaceable way, for example, a mounting hole is formed in a supporting base, then the rolling support is embedded into the mounting hole through extrusion, or threads are formed in the mounting hole to support the installation of the rolling support or replacement or disassembling of the rolling support by screwing.

As a preferred implementation manner, the material conveying device further includes an auxiliary roll ball layer arranged in the rolling groove and configured to support the roll ball, and the auxiliary roll ball layer includes a plurality of auxiliary roll balls.

To provide higher stability and reliability, one layer of finer auxiliary roll balls are arranged between the rolling groove and the roll ball to form secondary rolling contact for supporting the roll ball. The rolling combination formed by the roll ball and the auxiliary roll balls may realize a contact mode close to pure point contact, thereby further reducing friction resistance and improving rotation flexibility. Or a belt-shaped groove is formed in the rolling groove to provide a space for accommodating the auxiliary roll balls.

The above structure may be provided by the existing universal ball with a specific type.

A scraper includes:

a scraper body, having a bottom surface and a top surface opposite to the bottom surface; and a supporting body, formed on the bottom surface of the scraper body, wherein the supporting body is provided with a mounting surface and the mounting surface forms a part of the bottom surface; the mounting surface is provided with a rolling body, and the rolling body is able to support the scraper body when the scraper is located at a mounting position; moreover, the supporting body is a nonmetallic elastomer.

As another technical solution, which makes technical contribution to the prior art, of the present invention, the structure of the scraper itself is improved. The improvement of the scraper may be on the basis of a new scraper, and may also be implemented by improving and adjusting the structure of the existing scraper.

Apparently, the novel scraper is applied to a scraper conveyor taking the scraper as a core transportation unit, and various beneficial effects such as those described above may be achieved.

Furthermore, various preferences and improved optimization on the scraper mentioned above are similarly applicable to the technical solution taking the scraper as a theme, and the corresponding technical effects may be achieved.

A material conveying device includes:

a material conveying groove;

a scraper chain assembly, including:

an annular chain, the chain being able to circularly move relative to the material conveying groove along a material conveying direction;

scrapers, arranged on the chain at intervals, each of the scrapers including:

a scraper body, having a bottom surface close to the material conveying groove and a top surface opposite to the bottom surface;

a rolling body, arranged on the bottom surface of the scraper body, the rolling body being able to support the scraper body when the scraper is located above the material conveying groove; and a driving device, being able to drive the chain to rotate circularly relative to the material conveying groove along a material conveying direction.

As another technical solution, which makes technical contribution to the prior art, of the present invention, the rolling body can be directly formed on the bottom surface of the scraper body, thereby improving the operation condition of the scraper, reducing the mutual wear of the scraper and the material conveying groove, and achieving the beneficial effect of reducing, for example, the whole energy consumption of the scraper conveyor as the material conveying device. Preferably, the scraper is made of a composite structure, for example, the scraper is set as an inner core containing a macromolecular composite material and has considerable rigidity. The inner cover is covered with an elastic macromolecular composite material and has considerable elasticity.

The rolling body structure mentioned in the solution may directly quote the relevant elaboration and introduction of the rolling body mentioned above.

A scraper includes:
a scraper body, having a bottom surface and a top surface opposite to the bottom surface; and
a rolling body, arranged on the bottom surface of the scraper body, the rolling body being able to support the scraper body when the scraper is located at a mounting position.

Similarly, as another technical solution, which makes technical contribution to the prior art, of the present invention, the structure improvement of the scraper itself is not limited to that the rolling body is arranged by the supporting body described in the above solution. Similarly, the improvement of the scraper may be on the basis of a new scraper, and may also be implemented by improving and adjusting the structure of the existing scraper.

Apparently, the novel scraper is applied to a scraper conveyor taking the scraper as a core transportation unit, and various beneficial effects such as those described above may be achieved.

Furthermore, various preferences and improved optimization on the scraper mentioned above are similarly applicable to the technical solution taking the scraper as a theme, and the corresponding technical effects may be achieved.

It should be emphasized that the above overview is only used for the purpose of illustration and is not considered as a limitation to the present invention. In addition to the exemplary solutions, embodiments and features described above, the further solutions, embodiments and features of the present invention will be easily understood with reference to the accompanying drawings and the following detailed description.

BRIEF DESCRIPTION OF THE DRAWINGS

In the drawings, unless otherwise specified, the same reference numerals throughout various drawings represent the same or similar parts or elements. These drawings are not necessarily drawn to scale. It should be understood that the drawings only describe some embodiments disclosed according to the present invention and should not be considered as a limitation to the scope of the present invention.

DETAILED DESCRIPTION OF THE EMBODIMENTS

Hereinafter, only some exemplary embodiments are briefly described. As may be recognized by those skilled in the art, the described embodiments may be modified in different ways without departing from the spirit and scope of the present invention. Therefore, the accompanying drawings and description are considered as illustrative in nature and not restrictive.

Figure 11:
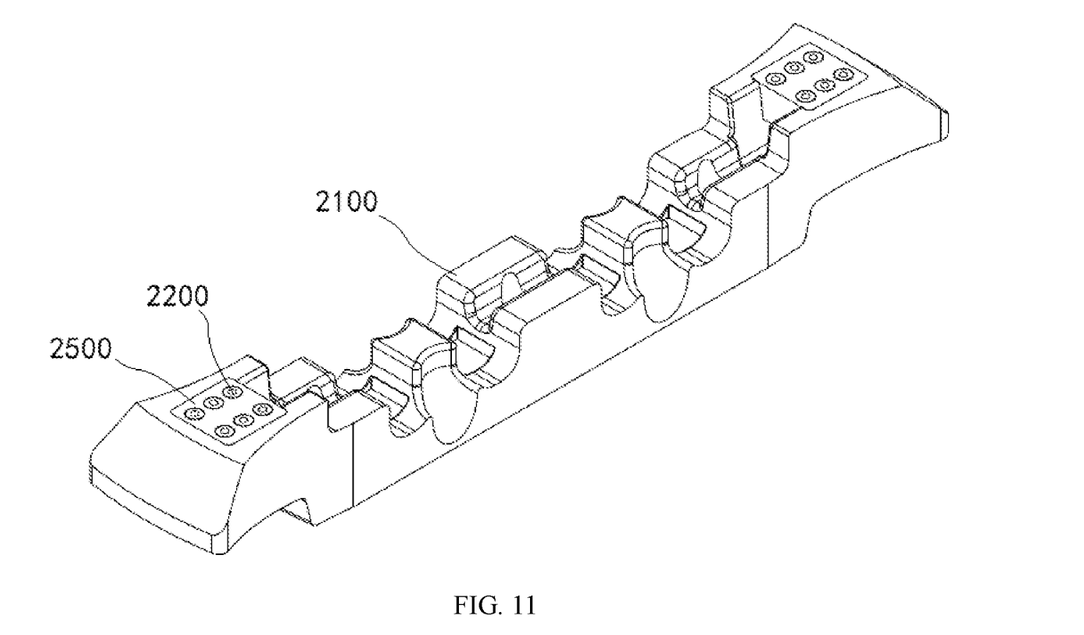
FIG. 11 is a three-dimensional structural schematic diagram of a scraper according to an embodiment of the present invention.
Figure 12:
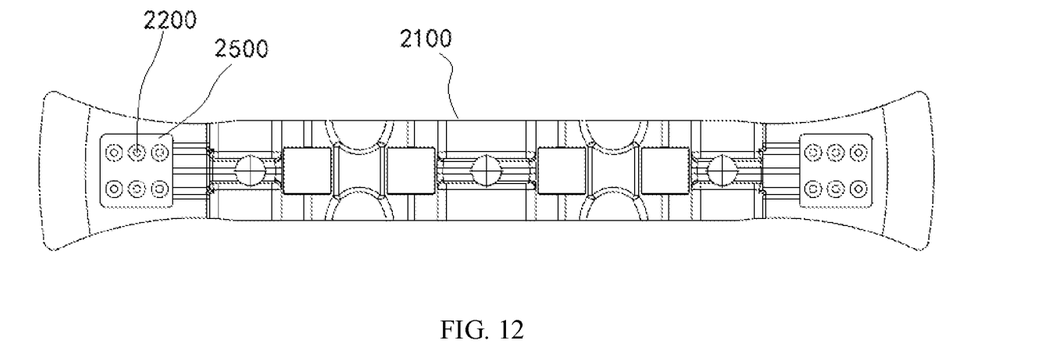
FIG. 12 is a schematic diagram of a bottom surface structure of a scraper according to an embodiment of the present invention.
Figure 13:
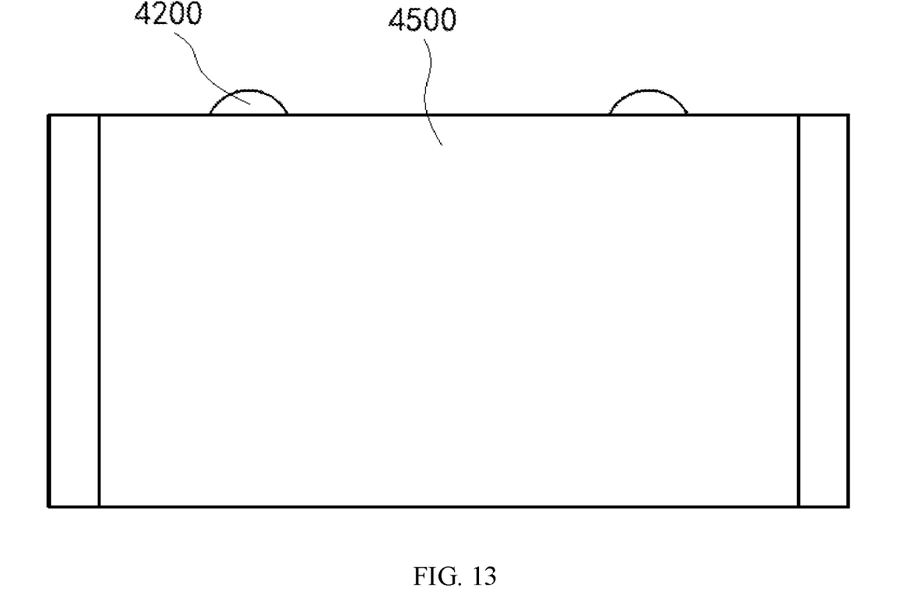
FIG. 13 is a side schematic diagram of an assembly that a rolling body in a scraper is mounted on a supporting body according to an embodiment of the present invention.
Figure 14:
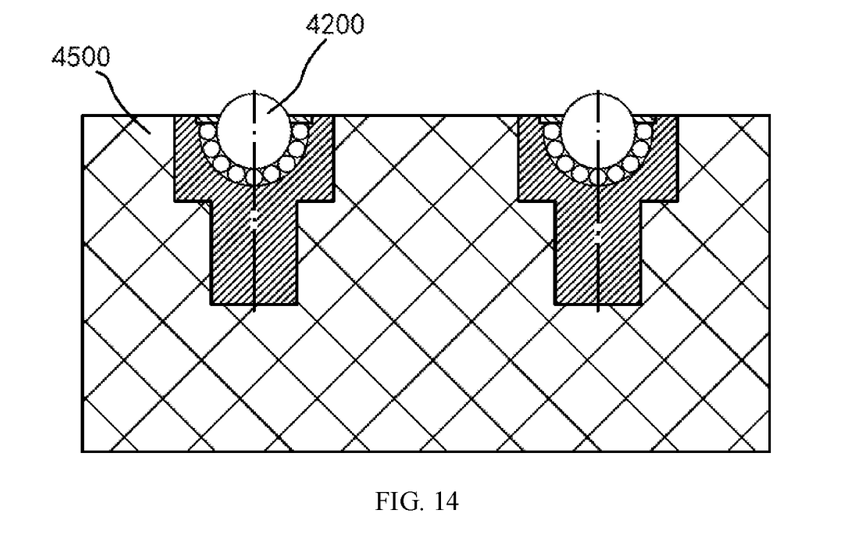
FIG. 14 is sectional schematic diagram of an assembly that a rolling body in a scraper is mounted on a supporting body according to an embodiment of the present invention, wherein the sectional position is a position where the rolling body is.
Figure 15:
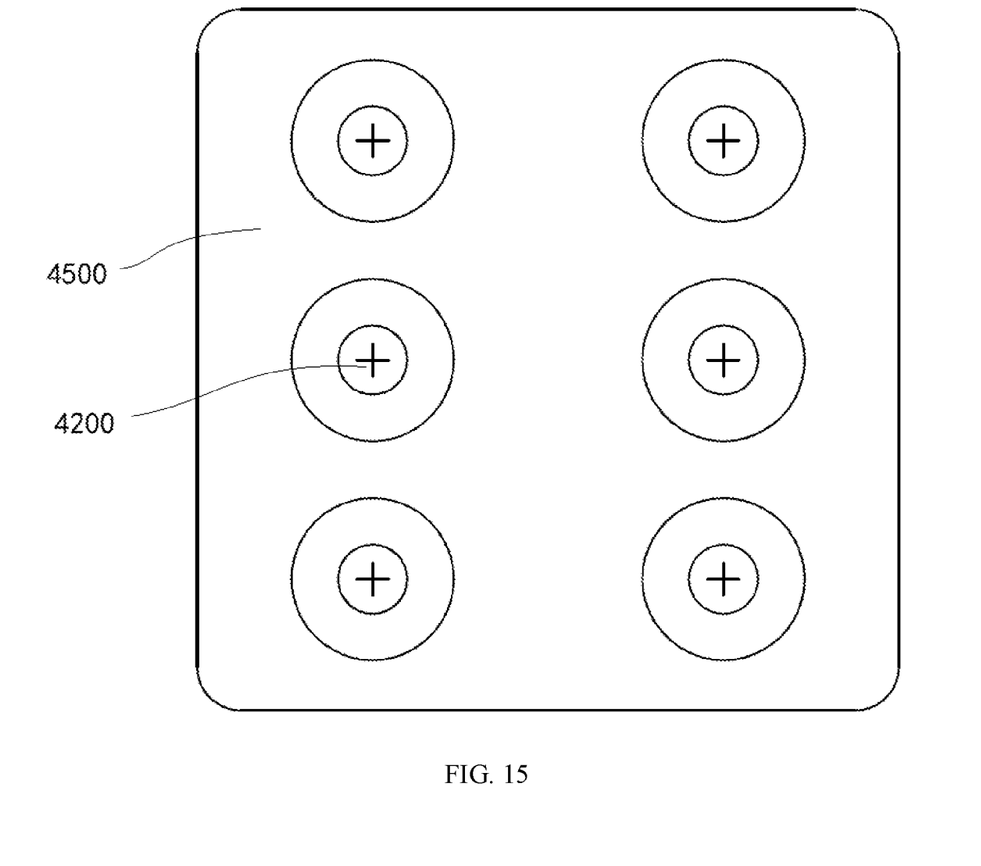
FIG. 15 is schematic diagram of a bottom surface of an assembly that a rolling body in a scraper is mounted on a supporting body according to an embodiment of the present invention.

In the implementation manners shown in FIG. 4 to FIG. 7, a material conveying device and a scraper in the conveying device will be described. Referring to FIG. 11 to FIG. 12, the scraper includes: a scraper body 2100, having a bottom surface and a top surface opposite to the bottom surface; and a supporting body 2500, formed on the bottom surface of the scraper body 2100, wherein the supporting body 2500 is provided with a mounting surface and the mounting surface forms a part of the bottom surface; the mounting surface is provided with a rolling body 2200, and the rolling body 2200 can support the scraper body when the scraper is located at a mounting position; moreover, the supporting body is a non-metallic elastomer. The mounting position described above refers to a position when the scraper is arranged on the chain. The mounting position may be changed differently according to the actual situation. It may be understood that since the rolling body is arranged on the mounting surface of the supporting body and the supporting body is formed on the bottom surface of the scraper body, the rolling body supports the scraper body indirectly, i.e., the rolling body supports the supporting body and the supporting body supports the scraper body. The mounting position described in the specification may be referred to the above description, which is not elaborated herein.

As matched with the scraper, the material conveying device, for example, the scraper conveyor further includes: a material conveying groove 2400; a scraper chain assembly, including an annular chain 2300, and the chain 2300 can circularly move relative to the material conveying groove 2400 along a material conveying direction; the scrapers are arranged on the chain 2300 at intervals and may be carried by the chain 2300 to circularly move on the material conveying groove 2400; moreover, the scraper will be supported by the rolling body 2200 in the material conveying groove 2400 to be in rolling friction contact with the interior of the material conveying groove 2400. A driving device (not shown in the figure) can drive the chain to circularly move relative to the material conveying groove 2400 along the material conveying direction.

The material conveying device, for example the scraper conveyor using the scrapers, is provided with the rolling bodies, the friction mode between the scraper and the material conveying groove is changed from the original sliding friction contact into the rolling friction contact, and the reduction of the friction coefficient may greatly reduce the friction resistance of the scraper and the groove body, thus reducing the power loss of the driving device driving the scraper, finally reducing the load energy consumption of the scraper conveyor, or improving the effective work applying rate of the output power. Therefore, reduction of the rated output power of the driving device is supported to achieve the aim of reducing the specifications of the driving device and realize optimal design.

Specifically, the calculation formula of the basic running resistance $W_{zh}$ of the on-load branch of the scraper conveyor is:

$$W_{zh}=(q\times\omega+q0\times\omega')L\times g\times\cos\beta\pm(q+q0)\times L\times g\times\sin\beta$$

In the formula:
  $W_{zh}$—basic running resistance (N) of the on-load branch of the scraper conveyor;
  L—design length (m) of the scraper conveyor;
  g—gravity acceleration, g=10 m/s$^2$;
  β—inclination angle)(° of the scraper conveyor;
  q—mass (kg) of each meter of material of the scraper conveyor;
  q0—mass (kg) of each meter of the scraper chain;
  ω—resistance coefficient of the material moving in a chute;
  ω'—resistance coefficient when the scraper chain moves in the on-load branch chute;
  "±"—taking "+" if the scraper chain transports upwards; otherwise, taking "−".

It can be seen from the above calculation formula that when the friction contact mode is changed, the resistance coefficient ω' will significantly decrease, for example, ω' is selected as 0.4 according to the standard design, the rolling friction mode of point contact is changed, and the ω' can be reduced to be 0.1 or below, thus significantly reducing the running resistance.

In addition, the rolling friction contact mode is bound to reduce the wear condition of the scraper and the groove ledge of the conveying groove, especially in cooperation with the supporting body constructed by the non-metallic elastomer, the contact of the rolling body and the conveying groove can be buffered by the elastic supporting body, thus further improving the operation stability of the scraper chain assembly in the rolling friction contact process. The most direct effect is that the wear loss of the scraper and the conveying groove is greatly reduced by the changed friction mode, and the replacement and maintenance cycles of the scraper are greatly prolonged and can be basically prolonged by at least three times compared with the traditional alloy steel scraper. Moreover, due to the change of the friction contact mode, the failure part of the scraper mainly occurs in the supporting body, and the scraper main body is hardly worn. When the scraper is replaced or maintained, it is only necessary to replace or maintain the supporting body, thus reducing the maintenance cost and improving the maintenance efficiency.

From another point of view, the supporting body serves as one part of the scraper, and the scraper body adopts the non-metallic elastomer instead of the common alloy steel, so that the weight of the scraper can be reduced to a certain degree, and the no-load load of the scraper conveyor can be further reduced.

The rolling body is arranged on the supporting body, the elastic function of the supporting body is to make the supporting body show a certain "expansion" trend, and the trend is released on the bottom surface of the supporting body to push the rolling body close to the conveying groove, so that the rolling body and the conveying groove can still be in effective contact. When a plurality of rolling body are provided, it may be ensured that all the rolling bodies can reliably keep contact with the conveying groove. On one hand, the load of the whole scraper is balanced, and on the other hand, the service life and the replacement cycle of the rolling bodies are uniform, so that the actual requirements of the industrial design are met.

Furthermore, in the whole scraper, when the supporting body supports the scraper body by the rolling body, the scraper as a whole has a certain degree of buffering. When the scraper receives impact applied by the top, the elasticity of the supporting body can buffer and absorb part of impact, so that the reverse impact received by the coal falling on the scraper can be reduced to a certain degree, thus enabling the coal to fall into the conveying groove after receiving the buffer, reducing the crushing events of the coal, increasing the proportion of the blocky coal in the coal and improving the quality of the coal.

The supporting body formed by the non-metallic elastomer serves as a supporting structure for mounting the rolling body, so that the elastic rolling meeting the overall stability of the structure is improved. The elastic buffering force is provided by the characteristic of the material, which does not depend on the specific elastic structure, so that the load balance and long-time stable operation of the rolling body may be maintained and the elastomer may maintain a stable state for a long time, thereby avoiding the failure caused by damage or deformation of the structure and the failure to maintain an ideal elastic property. This will be very suitable for the working environment of the coal mining the effect of the scraper conveyor. One idea is to adopt a metal elastomer, for example a spring, etc., to provide a buffering mode by an elastic structure, which is proved to be infeasible by the inventor. Especially in the coal mining, the coal particles and coal gangue particles in the conveying groove cause unevenness between the scraper and the conveying groove, and the spring only can provide an elastic supporting force in a roughly fixed direction and obviously cannot stably support the rolling body. In addition, if the spring is used as an elastic support, the spring is liable to be damaged due to contact between the spring and the material particles. The blocky non-metallic elastomer can perfectly avoid the defect of the metal elastomer and can serve as a whole body to support the rolling body from multiple angles and directions, and there is no need to worry about the structure damage as long as the supporting body is replaced or reconstructed after a certain degree of wear. By selecting appropriate materials, the supporting body may have higher wear resistance and corrosion resistance while having elasticity.

Figure 7:
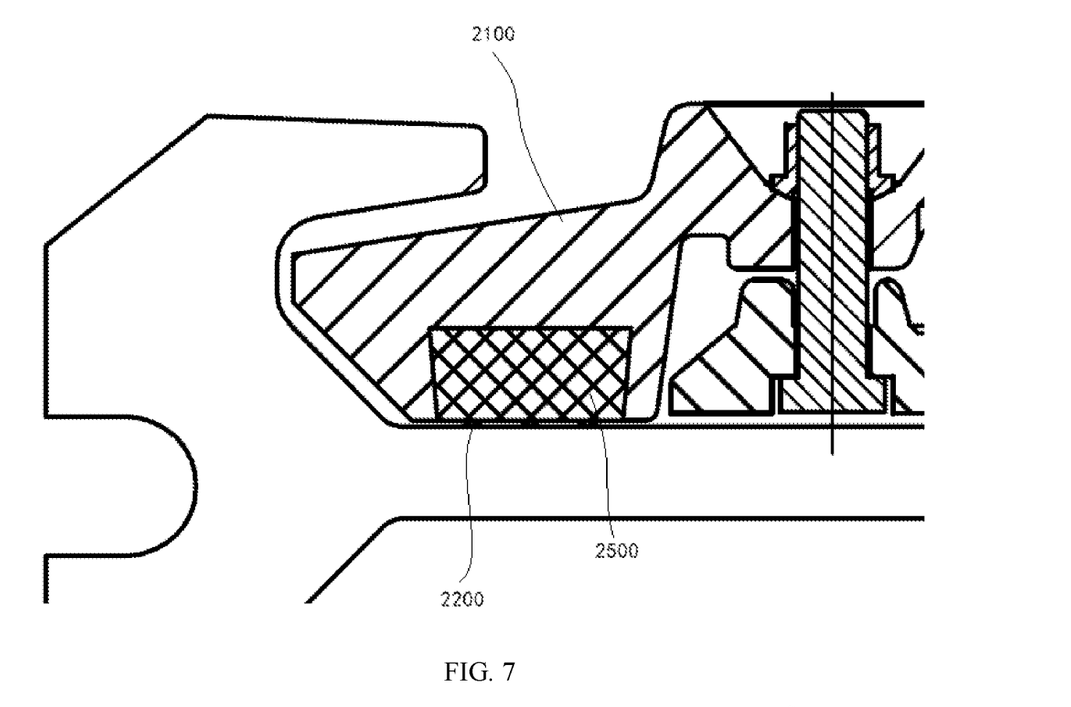
FIG. 7 is a partially enlarged schematic diagram of a supporting body part in FIG. 6.
Figure 8:
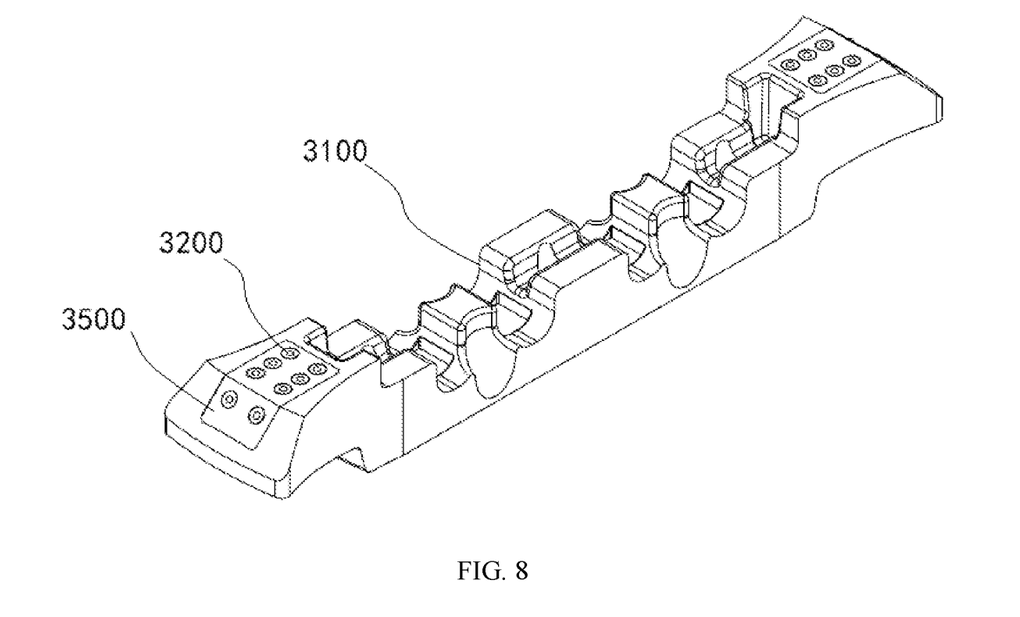
FIG. 8 is a three-dimensional structural schematic diagram of a scraper according to an embodiment of the present invention.
Figure 9:
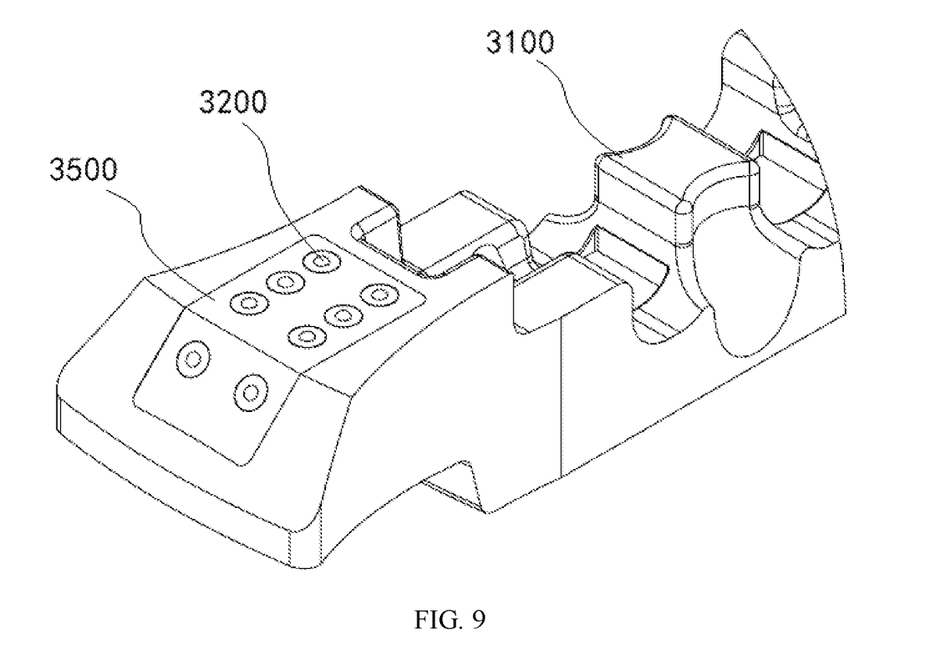
FIG. 9 is schematic diagram of a local structure of a scraper according to an embodiment of the present invention.

As shown in FIG. 7, a mounting groove is formed in the bottom surface of the scraper body 2100, and the supporting body 2500 can be embedded into the mounting groove.

One of the mounting methods of the supporting body is to form the mounting groove on the scraper body and mount the processed supporting body into the mounting groove. The elastic material of the supporting body determines that assembly may be conducted in an interference fit mode, or the supporting body with a larger size directly cooperates with the mounting groove with a smaller size, and the supporting body is embedded into the mounting groove through extrusion.

By the mounting method, the supporting bodies may be manufactured in batches; moreover, the rolling body may be mounted on the supporting body firstly, and then the rolling body and the supporting body are arranged on the scraper body, so that the assembling of the rolling body becomes simple and convenient. Furthermore, it is very simple and convenient to disassemble, assemble and replace the supporting body. Preferably, a texture or a step surface mutually matched with a combined surface is formed on the combined surface of the mounting groove and/or the supporting body, thereby improving the embedding tightness.

In an unshown implementation manner, the supporting body is integrally formed on the bottom surface of the scraper body.

Another forming method of the supporting body is to from the supporting body on the bottom surface of the scraper body through direct vulcanization, pouring or injection molding, which is suitable for manufacturing appropriate scraper bodies in batches. A forming surface or a forming groove is reserved, the scraper body serves as an external mold, and the non-metallic elastic material and the rolling unit are directly formed on the scraper body through direct vulcanization, pouring, injection molding and the like. By the forming method, the assembling process is simplified, and the combination tightness of the supporting body and the scraper body is improved. Of course, it also depends on the proper selection of the elastic material. An ideal combination effect may be achieved by selecting the non-metallic elastic material which is combined with the metal surface well and meets strength, corrosion resistance, weather resistance and other properties.

A material of the above supporting body is preferably a macromolecular polyurethane material.

As mentioned above, as the ideal effect of realizing the technical intention included in various implementation manners of the present invention, it is preferable to construct the supporting body by the macromolecular polyurethane material or other elastic materials with the same property. Specifically, the selected macromolecular polyurethane material or similar elastic material should meet or have the following properties:

hardness: SHA60-SHD70;
    tensile strength: 25-60 MPa;
    tear strength (right angle): 50-200 KN/m;
    elongation at break: 300-800%; and
    resilience: 25-70%.

Based on the above property requirement, manufacturing the corresponding elastic material may meet the requirement of the technical solutions in various implementation manners of the present invention on the construction of the supporting body, thereby achieving the technical effects mentioned above.

Referring to FIG. 10 and FIG. 13 to FIG. 15, to cooperate with the mounting of the rolling body, the supporting body is further provided with:

a rolling support 4201, arranged on the mounting surface of the supporting body, wherein a rolling groove is formed in the rolling support 4201; and a roll ball 4200, as a rolling body, is mounted in rolling groove.

The rolling body may be a composite rolling body or may be of a structure which independently can roll freely or has a free rolling trend. The ideal rolling body has a spherical roll ball structure, a rolling groove is provided in cooperation with the roll ball. The rolling groove is configured as a matched state where the roll ball is fixed in the rolling groove to form a spherical pair, and the rolling groove is of a semi-closed structure. The exposed part of the roll ball is in rolling contact, and the rest is in the rolling groove. The rapid implementation manner may be that an appropriate universal ball is directly used as a composite rolling body and a whole set of structure of the rolling support and the roll ball is provided. Of course, the rolling support and the roll ball may be self-processed according to the actual requirement.

The lubrication requirement of the roll ball may be met by filling a lubricating medium, or by setting a rolling groove opening to be matched with the size of the roll ball, so that materials with a very small particle size, such as mainly carbon powder particles in the coal, are allowed to enter between the roll ball and the rolling groove to serve as a lubricating medium for lubrication.

In particular, the roll ball and the rolling groove supporting the roll ball are in rigid contact. The direct supporting structure of the roll ball is preferably a rigid structure rather than an elastic structure, which will ensure the reliable combination of the roll ball and the rolling support.

Figure 10:
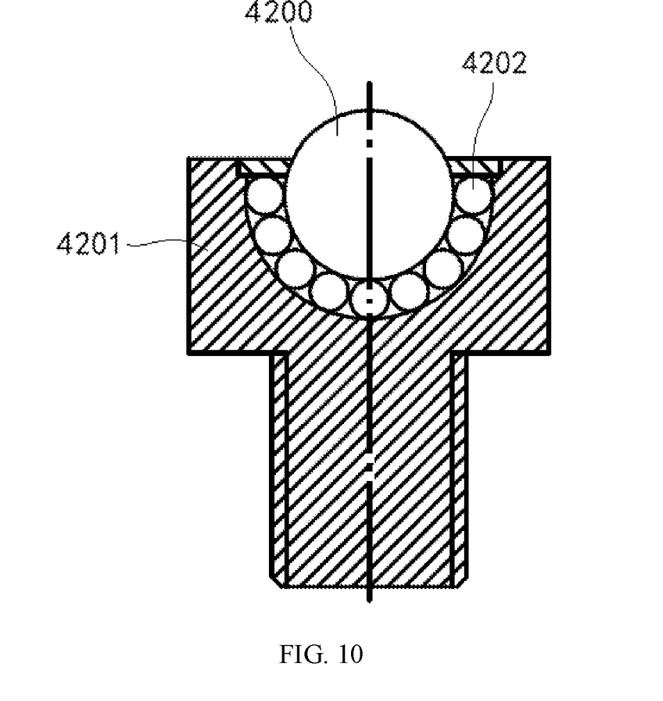
FIG. 10 is schematic diagram of a mounting structure of a rolling body according to an embodiment of the present invention.

Referring to FIG. 10, the rolling support 4201 may be detachably arranged on the mounting surface of the supporting body.

The self-processed rolling support or the rolling support provided by the manure existing finished product universal ball may be arranged in different ways, for example the rolling support may be jointly formed with the supporting body by mold pressing and pouring. One of the above preferred manners is to mount the rolling support and the supporting body together in a detachable and replaceable way, for example, a mounting hole is formed in the supporting base, then the rolling support is embedded into the mounting hole through extrusion, or threads are formed in the mounting hole to support the installation of the rolling support or replacement or disassembling of the rolling support by screwing.

Referring to FIG. 10, an auxiliary roll ball layer for supporting the roll ball 4200 in the rolling groove is arranged in a rolling bracket and includes a plurality of auxiliary roll balls 4202.

To provide higher stability and reliability, one layer of finer auxiliary roll balls are arranged between the rolling groove and the roll ball to form secondary rolling contact for supporting the roll ball. The rolling combination formed by the roll ball and the auxiliary roll balls may realize a contact mode close to pure point contact, thereby further reducing friction resistance and improving rotation flexibility. Or a belt-shaped groove is formed in the rolling groove to provide a space for accommodating the auxiliary roll balls.

At present, there are various optional universal balls, and the model number of the universal balls may be selected according to the following requirements:

the roll ball and the rolling bracket may be made of high-strength metal such as a stainless steel material; a diameter of the roll ball, for example, is selected from 6-20 mm; and a diameter of the auxiliary roll ball, for example, is selected from 2-5 mm. The universal balls may be purchased according to the specification of the existing product and may also be self-processed and manufactured. The principle and the products of the universal balls are well-know and mature technologies, which are thus not elaborated herein.

Figure 6:
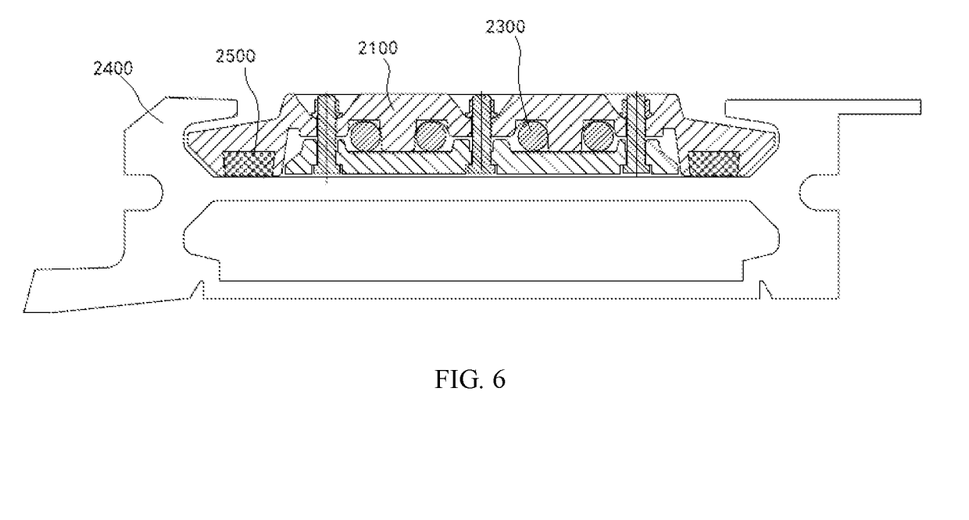
FIG. 6 is sectional schematic diagram of a scraper conveyor according to an embodiment of the present invention, wherein the sectional position is a position where the scraper is.

In an implementation manner shown in FIG. 6 and FIG. 7, as an adjustment to the above-mentioned implementation manner, the supporting body 3500 will not only be formed on the contact surface at the bottom of the scraper body 3100 and will further extend to an inclined surface on a bottom side of the scraper body 3100. This part of structure does not always keep contact with the conveying groove, but expanding the setting range of the supporting body and setting the rolling body 3200 on the inclined surface of the bottom side can further improve the operation condition of the scraper, particularly the scraper conveyor needs to be pushed in the operation process; therefore the scraper conveyor cannot be ensured to be always in a straight line and the scraper may swing and shake. The supporting body and the rolling body are beneficial to reducing the impact and wear of the conveying groove on the two ends of the scraper, thus prolonging the whole service life of the scraper and prolonging the replacement and maintenance period of the scraper.

It should be explained that in various implementation manners of the present invention, the inclined surface of the bottom side may be understood as a part of the bottom surface of the scraper body.

Figure 1:
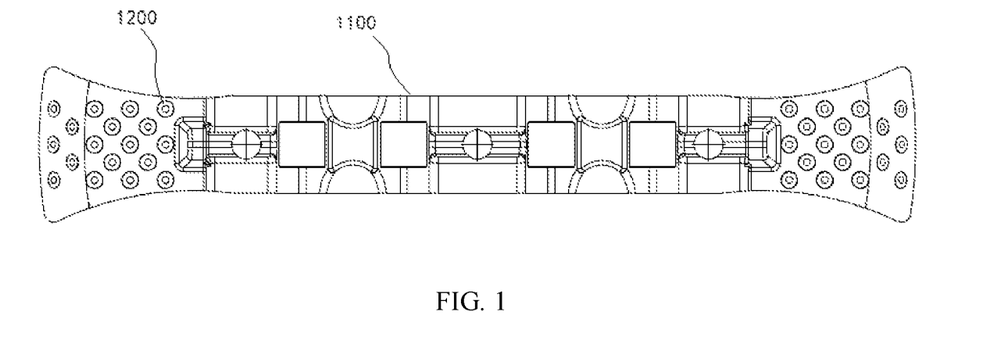
FIG. 1 is a schematic diagram of a bottom surface structure of a scraper according to an embodiment of the present invention.
Figure 2:
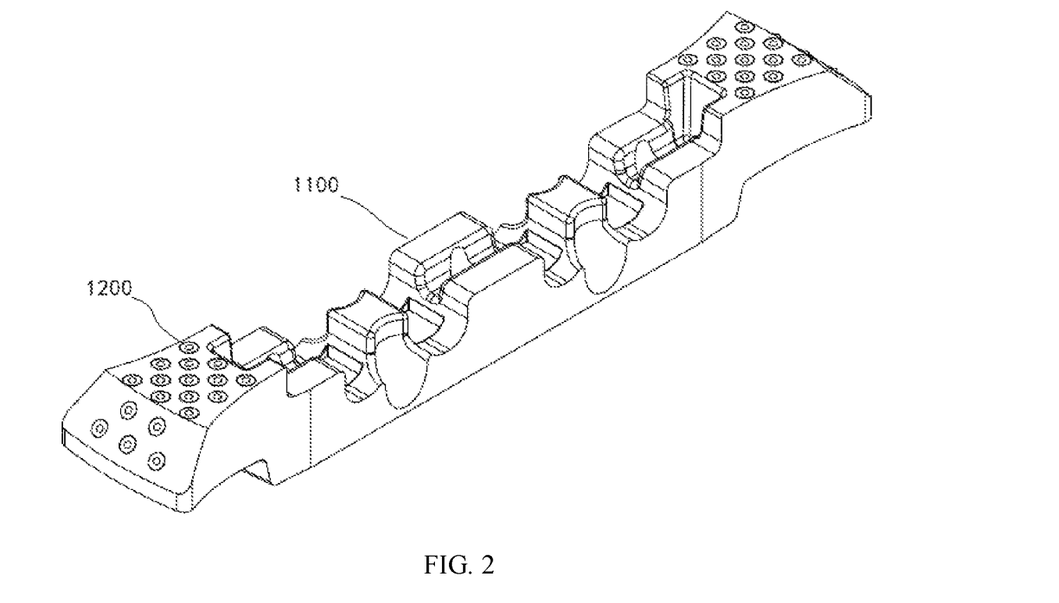
FIG. 2 is a three-dimensional structural schematic diagram of a scraper according to an embodiment of the present invention.
Figure 3:
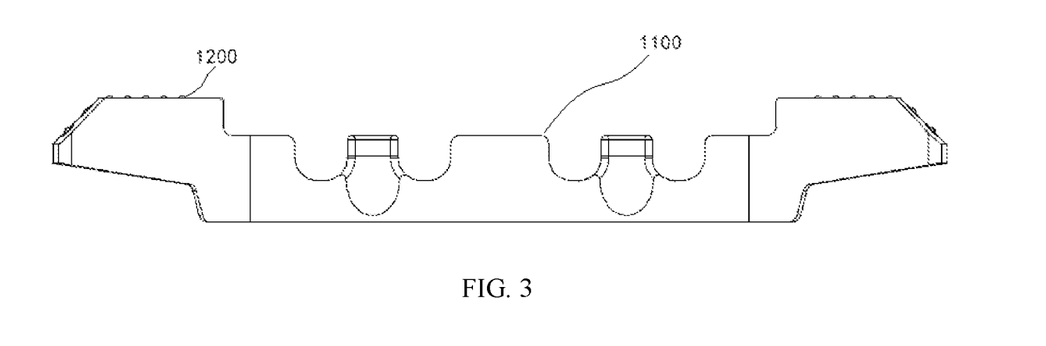
FIG. 3 is schematic diagram of a side structure of a scraper according to an embodiment of the present invention.
Figure 4:
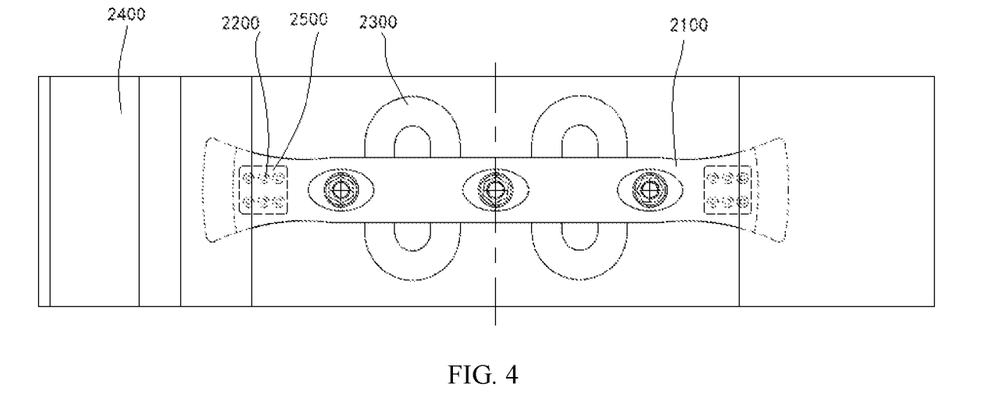
FIG. 4 is a truncated schematic diagram of a partial structure of a scraper conveyor according to an embodiment of the present invention.
Figure 5:
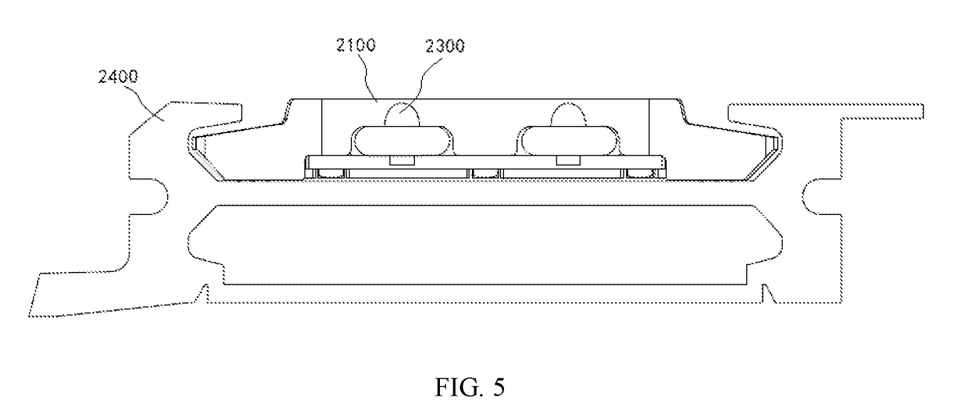
FIG. 5 is a sectional schematic diagram of a scraper conveyor according to an embodiment of the present invention, wherein the sectional position is an interval between scrapers.

In addition, referring to the implementation manners shown in FIG. 1 to FIG. 3, the present invention discloses another scraper structure, including: a scraper body 1100, the scraper body 1100 having a bottom surface close to a material conveying groove and a top surface opposite to the bottom surface; and a rolling body 1200 arranged on the bottom surface of the scraper body, the rolling body 1200 being able to support the scraper body 1100 when the scraper is located above the material conveying groove.

As an arrangement matched with the scraper structure, for example the scraper conveyor as the material conveying device further includes: a material conveying groove; a scraper chain assembly, including an annular chain, wherein the chain can circularly move relative to the material conveying groove along a material conveying direction, and the scrapers are arranged on the chain at intervals; and a driving device, being able to drive the chain to circularly rotate relative to the material conveying groove along the material conveying direction.

In the implementation manner, the rolling body can be directly formed on the bottom surface of the scraper body, thereby improving the operation condition of the scraper, reducing the mutual wear of the scraper and the material conveying groove, and achieving the beneficial effect of reducing, for example, the whole energy consumption of the scraper conveyor as the material conveying device. Preferably, the scraper is made of a composite structure, for example, the scraper is set as an inner core containing a macromolecular composite material and has considerable rigidity, and the rigidity is required to roughly reach the rigidity grade of metal with the same specification and size, such as alloy steel. Based on the requirement, the composite material has numerous implementable manners and material types, for example, a glass fiber composite material, a carbon fiber composite material and the like. The formation of the composite material is similarly a mature prior art. According to the property requirement, manufacturers may manufacture corresponding material products, and the specific formation process is not elaborated.

The inner core is covered with a macromolecular elastic material and has considerable elasticity, and the specific mechanical property requirements are as follows:

hardness: SHA60-SHD80;
tensile strength: 25-80 MPa;
tear strength (right angle): 50-230 KN/m;
elongation at break: 300-800%; and
resilience: 25-70%.

Based on the above property requirement, manufacturing the corresponding elastic material may meet the requirement of the technical solutions in various implementation manners of the present invention on the construction of the supporting body, thereby achieving the technical effects mentioned above.

The elastic materials with the above properties, particularly the known macromolecular polyurethane material products, the manufacturers may produce the material products with the above properties by various known formulas and processes. How to prepare various materials mentioned above is not the content which is covered by the technical contribution of the present invention to the technical field. The invention of property parameters is sufficient to support those skilled in the art to reproduce the technical solutions in various implementation manners according to the present invention. Therefore, the specific material preparation method or preferred formula will not be introduced in the specification. If there is a more suitable or preferred material formula, a material preparation method or a new material product, it will belong to the category of other inventions.

The rolling body structure mentioned in the implementation manner may directly quote the relevant elaboration and introduction of the rolling body mentioned above.

Those not mentioned in the present invention may be realized by adopting or learning from existing technologies.

The above is only the specific implementation manner of the present invention, but the protection scope of the present invention is not limited to this. Various changes or substitutions that are thought of by those skilled in the technical field within the technical scope disclosed by the present invention should be covered within the protection scope of the present invention. The scope of the invention should, therefore, be determined with reference to the appended claims.

In the description of the present invention, it should be noted that, a directional or positional relationship indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" and the like is based on that shown in the accompanying drawings, is merely intended to describe the present invention and simplify the description and does not indicate or imply that the indicated apparatus or component must have a special direction or is constructed and operated in a special direction, and thus cannot be understood as a limitation to the present invention.

Besides, the terms "first" and "second" are used only for description and shall not be interpreted as an indication or implication of relative importance or an implicit indication of the number of technical features. Thus, the feature defined by "first" and "second" can explicitly or implicitly include one or more characteristics. In the description of the present invention, "a plurality of" means two or more, unless otherwise specifically defined.

In the present invention, unless otherwise specified and defined, the terms such as "mounting", "connected", "connection", "fixed" and the like should be understood in a broad sense, for example, the "connection" may be fixed connection and may also be detachable connection or integrated connection, may be mechanical connection, may be electric connection and may also be communication, and may be direction connection, may be indirect connection through an intermediate medium and may also be internal communication of two components or interaction between two components. For those of ordinary skilled in the art, the specific meanings of the above terms in the present invention may be understood according to specific situations.

In the present invention, that a first feature is located at the "upper" or "lower" a second feature includes that the first feature is in direct contact with the second feature, or the first feature is not in direct contact with the second feature, but is in contact with the second feature by another feature between the first feature and the second feature unless otherwise specified and defined. Moreover, that the first feature is located at the "upper", "above" and "on" the second feature includes that the first feature is located right above and at the oblique top of the second feature, or only shows that the horizontal height of the first feature is greater than that of the second feature; and that the first feature is located at the "lower", "below" and "under" the second feature includes that the first feature is located under and at the oblique bottom of the second feature, or only shows that the horizontal height of the first feature is smaller than that of the second feature.

The above disclosure provides various different implementation manners or examples to implement different structures of the present invention. To simplify the disclosure of the present invention, parts and setting of the specific examples are described above. Of course, they are only examples and are not intended to limit the present invention. In addition, the present invention may repeat reference number and/or reference letters in different examples. The repetition does not indicate the relationship between various discussed implementation manners and/or setting and is for simplicity and clarity. In addition, the present invention provides various examples of specific processes and materials, but those of ordinary skill in the art may realize the application of other processes and/or use of other materials.

What is claimed is:

1. A material conveying device, characterized by comprising:
    a material conveying groove;
    a scraper chain assembly, comprising:
        an annular chain, the chain being able to circularly move relative to the material conveying groove along a material conveying direction;
        scrapers, arranged on the chain at intervals, each of the scrapers comprising:
        a scraper body, having a bottom surface close to the material conveying groove and a top surface opposite to the bottom surface;
        a supporting body, arranged on the bottom surface of the scraper body, a mounting groove is formed in the bottom surface of the scraper body, and the supporting body is able to be embedded into the mounting groove, or the supporting body is integrally formed on the bottom surface of the scraper body;
        the supporting body is provided with a mounting surface and the mounting surface forms a part of the bottom surface; the mounting surface is provided with a rolling body, and the rolling body is able to support the scraper body when the scraper is located above the material conveying groove; moreover,
        the supporting body is a nonmetallic elastomer; and
    a driving device, being able to drive the chain to rotate circularly relative to the material conveying groove along a material conveying direction.

2. The material conveying device according to claim 1, characterized in that a material of the supporting body is a macromolecular polyurethane material.

3. The material conveying device according to claim 1, characterized by further comprising:
    a rolling support, arranged on the mounting surface of the supporting body, wherein a rolling groove is formed in the rolling support; and
    the rolling body is a roll ball mounted in the rolling groove.

4. The material conveying device according to claim 3, characterized in that the rolling support is detachably arranged on the mounting surface of the supporting body.

5. The material conveying device according to claim 3, characterized by further comprising an auxiliary roll ball layer arranged in the rolling groove and configured to support the roll ball, the auxiliary roll ball layer comprising a plurality of auxiliary roll balls.

6. A scraper, characterized by comprising:
    a scraper body, having a bottom surface and a top surface opposite to the bottom surface; and
    a supporting body, formed on the bottom surface of the scraper body, a mounting groove is formed in the bottom surface of the scraper body, and the supporting body is able to be embedded into the mounting groove, or the supporting body is integrally formed on the bottom surface of the scraper body;
    the supporting body is provided with a mounting surface and the mounting surface forms a part of the bottom surface; the mounting surface is provided with a rolling body, and the rolling body is able to support the scraper body when the scraper is located at a mounting position; moreover,
    the supporting body is a nonmetallic elastomer.

* * * * *